UNITED STATES PATENT OFFICE.

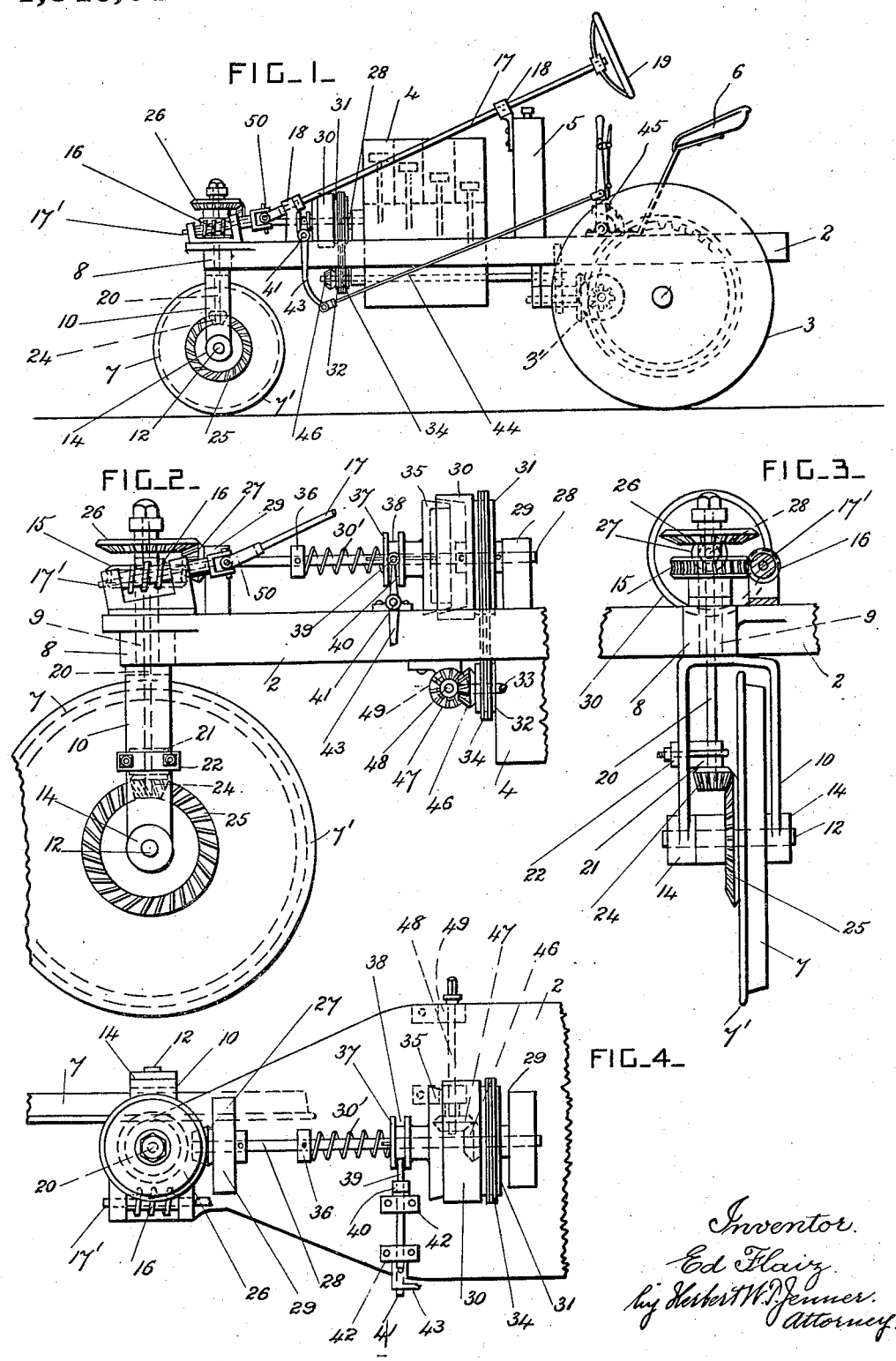

ED FLAIZ, OF OLATHE, COLORADO.

TRACTOR.

1,346,644. Specification of Letters Patent. Patented July 13, 1920.

Application filed April 23, 1919. Serial No. 292,026.

*To all whom it may concern:*

Be it known that I, ED FLAIZ, a citizen of the United States, residing at Olathe, in the county of Montrose and State of Colorado, have invented certain new and useful Improvements in Tractors, of which the following is a specification.

This invention relates to tractors principally used in connection with agricultural machinery; and it consists chiefly of a combined steering and auxiliary driving mechanism arranged at the front end of the machine and constructed as hereinafter fully described and claimed.

In the drawings, Figure 1 is a side view showing the outline of a tractor provided at its front end with a combined steering and auxiliary driving mechanism according to this invention. Fig. 2 is a detail side view of the steering and auxiliary driving mechanism. Fig. 3 is a front end view, and Fig. 4 is a plan view, of the same.

The tractor is provided with a main frame 2, which is substantially triangular at its front end and which has parallel side portions at its middle and rear parts. The two main ground wheels 3 are arranged at the rear part of the frame, one on each side thereof, and they are driven by any approved motor 4. The motor is preferably an internal combustion engine, and it is supported at the middle part of the frame, and is operatively connected with the ground wheels 3 by any suitable transmission gearing. The transmission gearing is indicated generally by the numeral 3' in Fig. 1. The ground wheels 3 are constructed and arranged in any approved way at the sides of the frame, and the transmission gear is not more fully shown, as it does not form a part of the present invention.

The radiator 5 for the engine is arranged at the rear part of the frame, and also the seat 6 for the driver, so that the tractor may be relatively short in proportion to its weight. The radiator is placed intermediate of the engine and the seat 6 for the driver, and can conveniently be cooled from the engine by a fan, in the usual way, when in that position. The engine and radiator are arranged to the front of the axis of the main ground wheels 3, and a direct driving connection is made between the front ground wheel and the engine by means of a single horizontal countershaft 28 as will be more fully described hereinafter.

A single front ground wheel 7 is arranged at the front end of the frame, and is used to steer the tractor, and also as an auxiliary driving wheel to increase its tractive power. The front end of the frame 2 has a vertical bearing 8 secured to it, and 9 is a hollow steering spindle which is journaled in the said bearing. The spindle 9 has a forked lower end portion 10, and the ground wheel 7 is secured on a shaft 12 which is journaled in bearings 14 on the arms of the forked portion 10. The front ground wheel 7 is arranged to one side of the axis of the tubular spindle 9, and it preferably has a circumferential flange 7' on one side next to the axis of the said spindle. A worm wheel 15 is secured on the upper end portion of the spindle 9, and 16 is a worm which gears into the worm wheel and which is secured on the steering shaft 17, or its extension section 17'.

The steering shaft 17 is journaled in suitable supporting bearings 18 on the frame, and it is arranged in an inclined position, and a steering hand wheel 19 is secured on its rear end portion conveniently near the seat for the driver.

A driving shaft 20 is journaled in the hollow or tubular steering spindle 9, and the spindle 9 is arranged at one side of the center of the arms of the forked portion 10, so that the shaft 20 may extend downwardly at one side of the ground wheel 7. The lower end portion of the shaft 20 is journaled in a bearing block 21 which is secured to one member of the forked portion 10 by a clamp 22. A beveled toothed pinion 24 is secured to the shaft 20 below the bearing block 21, and it gears into a beveled toothed wheel 25 secured to the ground wheel 7 concentric with its axis. The wheel 25 and its pinion 24 are preferably provided with skew beveled teeth. The bearing 21 is clamped to the lower part of the forked portion 10 so that it can be removed and replaced. Its use enables beveled toothed wheels of relatively small diameter to be used and to be held in driving engagement with each other, and the flange 7' on the ground wheel operates to counteract the disadvantage of placing the ground wheel to one side of the axis of the spindle 9.

A beveled toothed driving wheel 26 is secured on the upper end portion of the shaft 20 above the worm wheel. A beveled toothed pinion 27 is secured on a driving shaft 28 which is journaled in bearings 29 on the frame, and this pinion 27 gears into the wheel 26.

A clutch member 30 is mounted loosely on the driving shaft 28, and 31 is a sprocket wheel secured to the clutch member 30. A sprocket wheel 32 is secured on the crankshaft 33 of the motor, and 34 is a drive chain which passes over the two sprocket wheels, so that the clutch member 30 is driven continuously by the motor. A clutch member 35 is splined on the shaft 28, and is normally pressed into driving engagement with the clutch member 30 by means of a helical spring 30' arranged between the collar 36 and a collar 37 on the hub of the slidable clutch member 35. Any approved form of clutch members may be used, but friction clutch members are preferred.

The collar 37 has a circumferential groove 38, and 39 is a pin which projects laterally from an arm 40 which is secured on a rockshaft 41 which is journaled in bearings 42 on the frame and arranged under the collar 37. The pin 39 engages with the groove in the collar, and the rock-shaft is provided with a lever 43 at one end so that it can be operated to retract the slidable clutch member out of engagement with the clutch member 30.

An operating rod 44 is pivoted to the lever 43 and is provided with a handle arranged in convenient proximity to the seat of the driver, and it has a catch 45 of approved construction for holding it when the clutch members are separated. The spring 30' normally holds the clutch members in driving engagement, and the ground wheel 7 is revolved constantly by the engine without any manual action on the part of the operator. The operator can however place the ground wheel out of driving action, without stopping the clutch member 30 and the motor, by means of the lever 43 and parts connected to it, and can hold the slidable clutch member, after retracting it, by means of the catch 45. This arrangement enables the operator to handle the tractor with facility from his seat which is at the other end of the frame from the steering ground wheel 7.

A beveled toothed wheel 46 is secured on the engine crankshaft near the sprocket wheel 32, and gears into a beveled toothed wheel 47 secured on a cross-shaft 48 which is journaled in bearings 49 on the frame. This shaft is provided with a hand crank of any approved construction which is used in starting the engine in the usual way, and which is disengaged from the starting shaft 48 when the engine is started.

The steering wheel is shown arranged on the longitudinal center line of the tractor midway between the two main ground wheels, but when the tractor is used between rows of plants it can be arranged to one side of the center to clear one row of plants.

The main ground wheels can be unclutched from the engine in the usual way when desired, and both driving and steering can be accomplished by means of the front ground wheel 7. The front ground wheel is however chiefly used as an auxiliary driving wheel to increase the driving wheel base or contact with the ground and its periphery is arranged to revolve at the same speed as the peripheries of the main ground wheels.

The steering spindle can be turned completely around, and the front ground wheel can be turned to any desired angle, so as to turn the tractor to the right or to the left in a very short space. The arrangement of the parts of the tractor so that it is short in length in proportion to its weight, permits it to work close up to fences and in the corners of fields.

On account of the angle at which the steering shaft 17 is arranged, it is preferably made in two sections 17 and 17', and these two sections are connected together by a universal joint or coupling 50 of any approved construction. The worm 16 is secured on the short section 17' of the steering shaft which forms its front end portion.

What I claim is:

In a tractor, a frame, main ground wheels arranged at the sides of the rear part of the frame, a motor for driving the main ground wheels arranged at the middle part of the frame in front of their axis, a radiator for the motor arranged behind it and also in front of the axis of the main ground wheels, a steering and driving ground wheel pivoted on a vertical axis at the front part of the frame, a single countershaft arranged parallel to and in front of the crankshaft of the motor, and driving mechanisms operatively connecting the respective end portions of the said countershaft with the engine crankshaft and with the front ground wheel.

In testimony whereof I have affixed my signature.

ED FLAIZ.